(12) United States Patent
Terczynski et al.

(10) Patent No.: US 12,165,375 B2
(45) Date of Patent: Dec. 10, 2024

(54) IMAGE RECOGNITION AND REPORT GENERATION

(71) Applicant: Thumbtack, Inc., San Francisco, CA (US)

(72) Inventors: Brian David Terczynski, San Francisco, CA (US); Chia Hui Hsieh, San Francisco, CA (US); Kevin Matthew Beaulieu, New York, NY (US); Santiago Gil Castaneda, Ontario (CA); Benjamin Sam, Forest Hills, NY (US); Jesse Stauffer, Flower Mound, TX (US)

(73) Assignee: Thumbtack, Inc., San Francisco, CA (US)

( * ) Notice: Subject to any disclaimer, the term of this patent is extended or adjusted under 35 U.S.C. 154(b) by 15 days.

(21) Appl. No.: 17/730,022

(22) Filed: Apr. 26, 2022

(65) Prior Publication Data
US 2023/0334812 A1    Oct. 19, 2023

Related U.S. Application Data

(60) Provisional application No. 63/332,566, filed on Apr. 19, 2022.

(51) Int. Cl.
*G06K 9/00* (2022.01)
*G05B 23/02* (2006.01)
(Continued)

(52) U.S. Cl.
CPC ......... *G06V 10/22* (2022.01); *G05B 23/0216* (2013.01); *G05B 23/0283* (2013.01);
(Continued)

(58) Field of Classification Search
CPC .... G06K 9/00536; G06K 9/62; G06K 9/6267; G06T 7/0002; G06T 7/0004; G06T 7/0006; G06T 7/0008; G06T 7/001; G06T 7/50; G06T 7/60; G06T 7/70; G06T 2207/30108; G06T 2207/30132; G06T 2207/30136; G06T 2207/30164; G06T 2207/30168; G06V 10/17; G06V 10/22; G06V 10/225; G06V 10/25; G06V 10/42; G06V 10/422; G06V 10/424; G06V 10/44; G06V 10/443; G06V 10/469; G06V 10/70; G06V 10/74;
(Continued)

(56) References Cited

U.S. PATENT DOCUMENTS 10,565,635 B2 *  2/2020  Forss ................... G06V 10/764
11,049,063 B2 *  6/2021  Ali ........................ G06Q 10/087
(Continued)

*Primary Examiner* — Eric Rush
(74) *Attorney, Agent, or Firm* — Thompson Hine LLP

(57) ABSTRACT

Image recognition and report generation is described. A camera component of a mobile device captures image frames of a physical environment. Each frame is run through an image recognition library to identify object(s) of interest. An object of interest is determined and it is an item associated with periodic maintenance. An identification of the identified object of interest is transmitted to a server. The mobile device receives information about the identified object of interest from the server that is based on a location of the mobile device, the information including a maintenance plan for the identified object of interest.

26 Claims, 6 Drawing Sheets

(51) Int. Cl.
| | |
|---|---|
| *G06Q 10/20* | (2023.01) |
| *G06T 7/00* | (2017.01) |
| *G06T 7/70* | (2017.01) |
| *G06V 10/10* | (2022.01) |
| *G06V 10/22* | (2022.01) |
| *G06V 10/46* | (2022.01) |
| *G06V 10/70* | (2022.01) |
| *G06V 10/764* | (2022.01) |
| *G06V 20/10* | (2022.01) |
| *G06V 30/142* | (2022.01) |
| *G06V 30/148* | (2022.01) |
| *G06V 30/19* | (2022.01) |

(52) U.S. Cl.
CPC ........... *G06Q 10/20* (2013.01); *G06T 7/0004* (2013.01); *G06T 7/0008* (2013.01); *G06T 7/70* (2017.01); *G06V 10/17* (2022.01); *G06V 10/469* (2022.01); *G06V 10/70* (2022.01); *G06V 10/764* (2022.01); *G06V 10/768* (2022.01); *G06V 20/176* (2022.01); *G06V 30/142* (2022.01); *G06V 30/153* (2022.01); *G06V 30/19* (2022.01)

(58) Field of Classification Search
CPC .... G06V 10/764; G06V 10/768; G06V 10/82; G06V 10/84; G06V 10/87; G06V 20/176; G06V 20/20; G06V 20/35; G06V 20/36; G06V 20/38; G06V 20/39; G06V 20/50; G06V 20/62; G06V 20/64; G06V 30/10; G06V 30/142; G06V 30/1444; G06V 30/1448; G06V 30/148; G06V 30/153; G06V 30/19; G06Q 10/20; G01N 21/00; G01N 21/01; G01N 21/88; G01N 21/8803; G01N 21/8851; G01N 21/95; G01N 21/956; B66B 5/0006; B66B 5/0018; B66B 5/0025; B66B 5/0031; B66B 5/0037; B66B 5/0087; G05B 23/00; G05B 23/02; G05B 23/0205; G05B 23/0216; G05B 23/0259; G05B 23/0264; G05B 23/0267; G05B 23/0272; G05B 23/0275; G05B 23/0283; E01C 23/00; E01C 23/01
USPC ....... 382/100, 103, 141, 143, 152–155, 159, 382/181, 198–200, 209, 215–218, 382/224–227, 282, 291, 292, 321, 325; 348/27–130, 135–137; 356/625, 627, 356/628, 630, 631, 634, 635, 237.1, 356/237.2; 700/95, 108–110, 115–117, 700/174–176; 702/33–36, 81–84, 702/155–158, 176, 177, 181–185
See application file for complete search history.

(56) References Cited

U.S. PATENT DOCUMENTS

| | | | |
|---|---|---|---|
| 11,620,037 B2* | 4/2023 | Fastner | G06F 3/0484 |
| | | | 715/837 |
| 2009/0024628 A1* | 1/2009 | Angel | G06Q 20/40 |
| | | | 348/36 |
| 2014/0228061 A1* | 8/2014 | Draznin | H04L 12/1895 |
| | | | 455/466 |
| 2015/0112704 A1* | 4/2015 | Braun | G06Q 10/10 |
| | | | 705/2 |
| 2015/0120606 A1* | 4/2015 | Hashimoto | G06Q 30/016 |
| | | | 705/343 |
| 2017/0178222 A1* | 6/2017 | High | G06Q 30/0631 |
| 2018/0137613 A1* | 5/2018 | Mennicken | G06V 10/75 |
| 2019/0050942 A1* | 2/2019 | Dalal | G06T 7/75 |
| 2019/0158547 A1* | 5/2019 | Fink | G06V 10/95 |
| 2019/0268472 A1* | 8/2019 | Amir | G06T 1/20 |
| 2019/0279151 A1* | 9/2019 | Felice | H04N 7/185 |
| 2020/0042954 A1* | 2/2020 | Parris | G06N 5/02 |
| 2020/0151450 A1* | 5/2020 | Hishinuma | G06T 7/70 |
| 2020/0257917 A1* | 8/2020 | Moore | G06V 10/751 |
| 2020/0302630 A1* | 9/2020 | Spader | G06V 10/82 |
| 2020/0349528 A1* | 11/2020 | Agassi | G06V 10/40 |
| 2020/0410278 A1* | 12/2020 | Nelson | G06T 7/0002 |
| 2021/0398356 A1* | 12/2021 | Rex | G06V 10/764 |

* cited by examiner

IMAGE RECOGNITION AND REPORT GENERATION

CROSS-REFERENCE TO RELATED APPLICATIONS

This application claims the benefit of U.S. Provisional Application No. 63/332,566, filed Apr. 19, 2022, which is hereby incorporated by reference.

FIELD

Embodiments of the invention relate to the field of image recognition; and more specifically, to image recognition and report generation.

BACKGROUND

Managing a property such as a residence or a commercial building is a daunting task. There are many aspects of the property that require periodic attention such as replacing a roof, cleaning gutters, resealing windows, air conditioning and heating, cleaning and maintenance, etc. Further, many items require regular maintenance. Additionally, items often break and require remedial repairs (leaky faucets, clogged drains, broken refrigerators). Keeping track of the items that need attention, when to do them, and/or who to contact for help, is a daunting task.

SUMMARY

Image recognition and report generation is described. In one aspect, a method is performed by a mobile device as part of the image recognition and report generation. The method includes a camera component of the mobile device capturing image frames of a physical environment; running each frame through an image recognition library to identify object(s) of interest, where the object of interest is an item associated with periodic maintenance; transmitting an identification of the identified object of interest to a server; and receiving information about the identified object of interest from the server that is based on a location of the mobile device, the information including a maintenance plan for the identified object of interest. The method may further include displaying the maintenance plan on the mobile device. The maintenance plan may include a listing of professional(s) within a predefined distance of the location of the mobile device that are suitable for performing maintenance on the identified object of interest. The method may further include determining a spatial position of the mobile device, where identifying the object of interest further includes using the determined spatial position of the mobile device to identify the object of interest. The method may further include determining, through the running each of the set of image frames through the image recognition library, a condition of the identified object of interest; and transmitting the determined condition of the identified object of interest to the server, wherein the received information about the identified object of interest is further customized based on the determined condition of the identified object of interest. The method may further include transmitting the location of the mobile device to the server. The method may further include determining a size of the identified object of interest using the mobile device; transmitting the determined size of the identified object of interest to the server, wherein the received information about the identified object of interest is further customized based on the determined size of the identified object of interest. The method may further include detecting text on at least one of the image frames that contains the identified object of interest; performing text recognition based on the detected text to obtain a text string; determining that the text string is a text string of interest; transmitting the text string of interest to the server; where the received information about the identified object of interest is further customized based on the text string of interest. The method may further include determining, from the captured set of image frames of the physical environment, that the physical environment does not include a particular object; transmitting, to the server, an identification of the particular object determined to not be included in the physical environment; where the information including the maintenance plan for the identified object of interest is included in a report received from the server, wherein the report further includes information about the particular object determined to not be included in the physical environment. The method may further include determining a type of the physical environment; transmitting the type of the physical environment to the server; where the received information about the identified object of interest is further customized based on the type of the physical environment. The method may further include identifying another object of interest based on at least the running each of the set of image frames through the image recognition library, wherein the identified object of interest is an item that has compliance requirements; transmitting, to the server, an identification of the identified object of interest and an image of the identified object of interest; and receiving, from the server, information about the identified object of interest including a compliance status of the identified object of interest. The compliance status may indicate that the identified object of interest is not in compliance, and the received information about the identified object of interest may include a recommendation for making the identified object of interest be in compliance.

In further aspects, one or more embodiments of a non-transitory computer-readable medium or distributed media containing computer-executable program instructions or code portions stored thereon are disclosed for performing one or more embodiments of the methods of the present invention when executed by a processor entity of an apparatus, a user equipment, or other computing device. Further features of the various embodiments are as claimed in the dependent claims.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
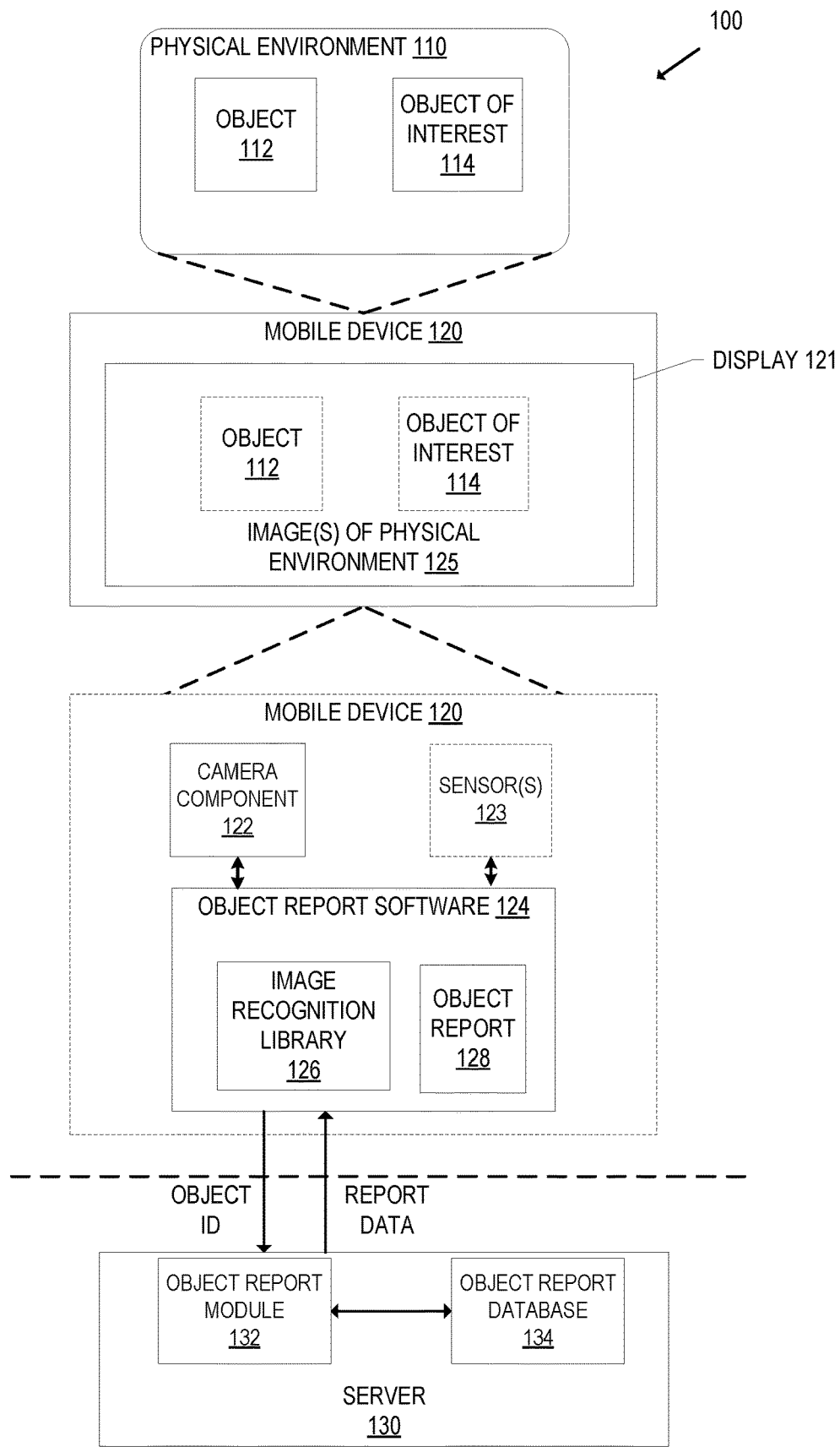
FIG. 1 illustrates an exemplary system for the use of image recognition for automatically generating a report according to an embodiment.

Image recognition and report generation is described. The image recognition and report generation may be used for constructing and/or managing a property plan. The property plan may include items related to property maintenance and/or property compliance. Image(s) of the physical environment of the property are captured (e.g., a video of the property). For example, a mobile device may capture the image frame(s) using an onboard camera component of the mobile device. Object(s) of interest within those image frame(s) are automatically recognized using image recognition. For instance, the mobile device may identify the object(s) of interest using an image recognition library hosted on the mobile device. As another example, the mobile device may transmit the captured image frame(s) to a remote device, such as a server, that identifies the object(s) of interest using an image recognition library. After the object (s) of interest are identified, report data about those object(s) is determined and may be displayed on the mobile device. For instance, the server determines the report data based at least on the identified object(s). The report data may be displayed on the mobile device.

The report may include information about the detected object(s) of interest in the physical environment and/or information about predefined object(s) of interest that were not detected in the physical environment. The report may include property maintenance information such as a maintenance plan for a detected object of interest (e.g., when maintenance should be performed, what maintenance should be performed, possible professional(s) that are suitable for performing the maintenance, why the maintenance should be performed, an estimate of the cost of the maintenance, etc.). The report can include compliance information for the property (in addition to or in lieu of property maintenance information). For example, the report can include items that are required for compliance that have been detected as missing from the property and/or items that are not in compliance. The report can include suggestions or recommendations for purchasing the missing items and/or putting the property into compliance. For instance, the report may include a list of professional(s) that can provide services to put the property into compliance. There are several forms of compliance that may be included in the report including safety, child safety, disability compliance, and/or accommodations for pets.

Safety compliance information may include items that are not found during the image recognition described herein but are required items for safety of the property such as fire extinguishers, smoke detectors, carbon monoxide detectors, exit signs, fire escape plans, etc. Another example is fall prevention items such as identifying missing railings. Another example is toxicity safety such as improper ventilation in damp areas such as bathrooms.

Child safety compliance information may include items that are not found for child safety such as outlet protectors, gates on stairs, corner protectors, etc.

Disability compliance information may be included on the report for items detected during the image recognition that may not be compliant with accessibility or disability ordinances (such as ones identified by the Americans with Disabilities Act) and/or items not detected during the image recognition that are required for compliance. These can be things such as ramps as alternatives to stairs, ADA-compliant door handles or push bars, and items positioned at heights suitable for persons in wheelchairs.

Accommodations for pets compliance information may include items that were not found during the image recognition described herein to accommodate pets, such as pet doors to allow animals free access to outdoor areas, sufficient outdoor space for pet exercise and relief, safety features for pets such as non-slip surfaces on stairs, and items that may be more prone to pet damage such as plush carpeting or upholstery.

Note that not all of the compliance dimensions listed above will be applicable in all scenarios. The user can decide which items they would like to have surfaced in the report depending on their situation. For example, people with pets may want to include such items in the report. Or if the residence in question has occupants with vision impairments, they may want the report to identify improvements to accommodate eyes-free management of the residence.

In an embodiment, the mobile device captures frames of images through the onboard camera component and runs each image through an on-device image recognition library to identify the object(s) of interest. The mobile device may draw the identified object of interest on the image frame. In an embodiment, for each object of interest identified, the mobile device transmits a list of the objects to a server. The server accesses information about each object of interest and returns the information to the mobile device. The mobile device can show the information on the display. In another embodiment, for each object of interest identified, the mobile device displays an option for a user to select to receive more information about the object of interest. Responsive to a selection of an object of interest, the mobile device transmits an identifier of that object to the server, which then accesses information about that object of interest and returns the information to the mobile device. The mobile device can show the information on the display of the mobile device.

The report data that is returned to the mobile device can take different forms. Examples include: a description of the object, a maintenance plan for the object (e.g., when maintenance should be performed, what maintenance should be performed, possible professional(s) that are suitable for performing the maintenance, why the maintenance should be performed, an estimate of the cost of the maintenance, etc.), warranty information of the object, recall information of the object (if any), product availability of the object (e.g., for replacement), expiration date of the object, services available for the object, brand and/or model identification of the object (e.g., particular HVAC system, particular water heater), identified condition of the object (e.g., excellent, good, fair, poor, replacement), detected size of the object, compliance information of the object, etc.

A list of the object(s) of interest and optionally the data associated with the object(s) of interest may be stored such that the information can be presented to the user later. Further, in cases where the mobile device captures video, the video, with the object(s) of interest and displayed information, may be recorded for the user to playback later.

In an embodiment, the mobile device displays information over the image on the mobile device (e.g., augmented reality). In such a case, if the mobile device is moved, other object(s) of interest may be identified and associated information may be presented. The information displayed can be received from the server or from local metadata of the mobile device. Thus, embodiments allow for a user to use a mobile device that includes a camera to take a video and the system will automatically identify object(s) of interest, determine information associated with those object(s) (e.g., a maintenance plan for each object of interest, a list of professional(s) that can service and maintain the items, compliance information, etc.), and provide that information to the user. In some cases, the user is not required to provide further input other than taking video of the property.

In an embodiment, the information presented to the user includes a listing of one or more professionals that can service an object of interest, and the user can use the listing to contact and/or hire a professional to execute on the maintenance and/or compliance plan.

FIG. 1 illustrates an exemplary system for the use of image recognition for automatically generating a report according to an embodiment. The report may include a property plan (e.g., a maintenance plan and/or compliance plan) according to an embodiment. The system 100 includes the mobile device 120 and the server 130. The mobile device 120 is a computing device that includes the functionality of taking images through the camera component 122 and can communicate with the server 130 over a network. Example form factors of the mobile device 120 include a smartphone, a tablet, a wearable device, a laptop, etc.

The mobile device 120 captures images of the physical environment 110 through the camera component 122. The physical environment 110 may be indoors and/or outdoors. As an example, the physical environment 110 may be a room within a property such as a home. In practice, a user of the mobile device 120 may use the camera component 122 to capture image frames of the physical environment, such as by recording a video of the physical environment 110. In the example of FIG. 1, the camera of the mobile device 120 is pointing towards the physical environment 110 such that image(s) of the physical environment 125 are taken and displayed on the display 121 of the mobile device.

A typical physical environment may include objects that are not of interest and objects that are of interest. An object of interest is an object for which additional information is known by the image recognition system about that object and may be of interest to the user. For instance, an object of interest may be an object for which a maintenance plan can be determined, for which a service may be provided (e.g., a sink being serviced by a plumber; a couch being serviced by a furniture mover; a guitar lesson for a detected guitar object), and/or is associated with required compliance for the property (e.g., safety compliance, child safety compliance, disability compliance, accommodation for pets compliance). In the example of FIG. 1, the physical environment 110 includes the object 112, which is not an object of interest, and the object of interest 114.

Figure 2:
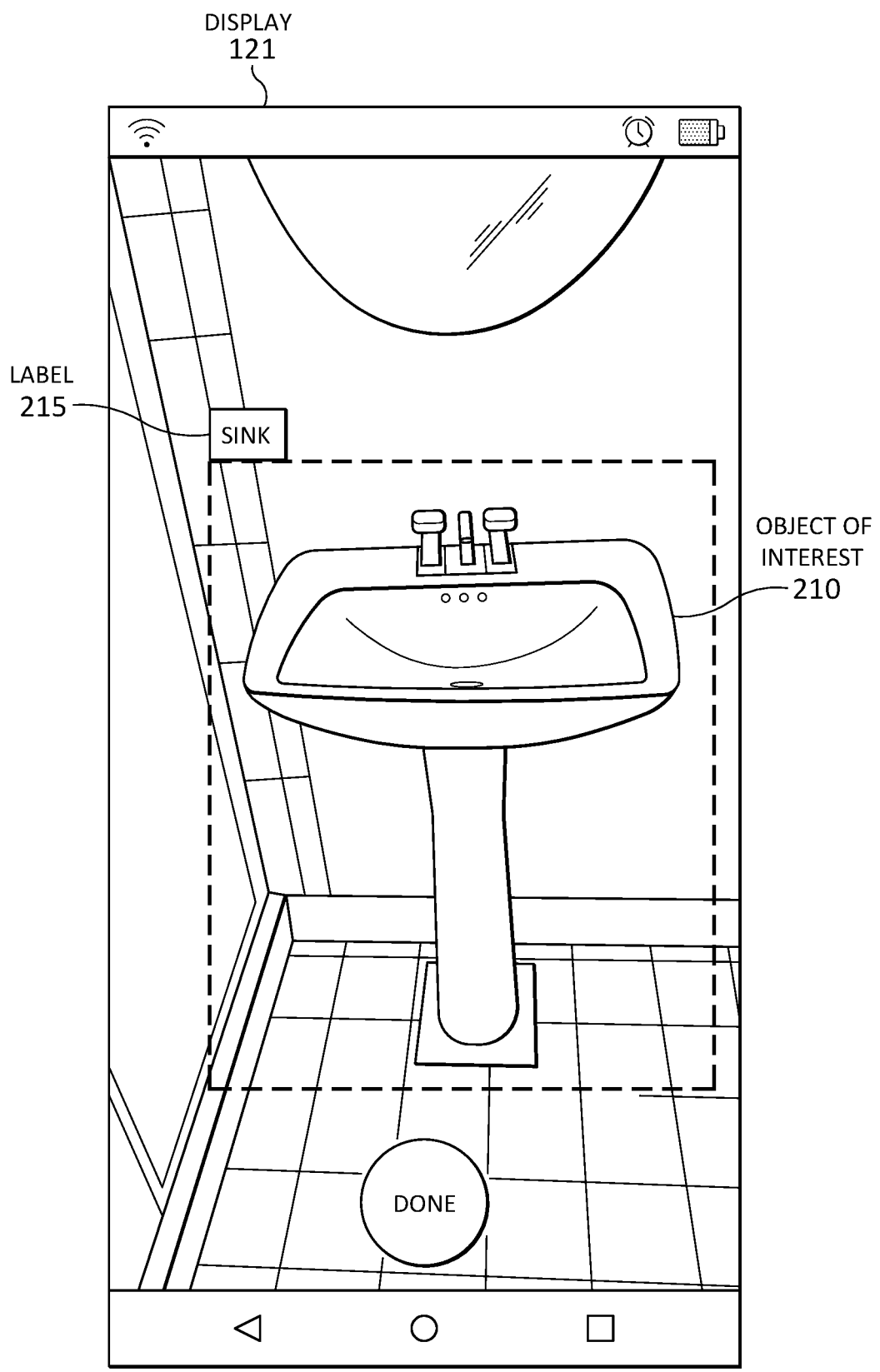
FIG. 2 shows an example user interface of a mobile device that shows an identified object of interest according to an embodiment.

The mobile device 120 identifies the object(s) of interest within the image frames. For instance, the object report software 124 is configured to identify objects of interest in image frames that are captured by the camera component 122. The object report software 124 includes the image recognition library 126. The image recognition library 126 and any updates to the library are received from a model host (e.g., available through the server 130 or through another remote device). Thus, as illustrated in FIG. 1, the mobile device 120 includes an on-device copy of the image recognition library 126. This library is used when identifying the objects of interest in real-time. The object report software 124 may draw the identified object of interest on the image frame (e.g., with a box that bounds the identified object of interest). FIG. 2 shows an example user interface of a mobile device that shows an identified object of interest according to an embodiment. The object of interest 210 is a sink, as indicated by the label 215 around the image of the sink.

The object report software 124 identifies an object within the image frames with a confidence level. In an embodiment, the image recognition does not use contextual information when classifying the objects. In another embodiment, the image recognition considers contextual information when classifying the objects such as the spatial position and/or orientation of the mobile device; the type of physical environment; the location of the mobile device; known information of the user, the determined size of the object, and/or textual information on the object.

As an example, the mobile device 120 may include one or more sensors 123 that can be used to determine the spatial position and/or orientation of the mobile device 120. For instance, the sensor(s) 123 may include a compass and/or a gyroscope that can be used to infer the direction of the object found (e.g., on the floor, on the ceiling, etc.) which can be used when classifying the objects. For instance, if the sensor data indicates that the mobile device is pointing towards the ceiling (and thus recording image(s) towards the ceiling), the object report software 124 may use that information when classifying the object (e.g., give greater weight to objects that are typically located on the ceiling or otherwise not on the floor).

As another example, the object report software 124 may consider the type of physical environment when classifying objects. For instance, whether the physical environment is inside or outside. And if inside, the type of room (e.g., bedroom, kitchen, living room, bathroom, etc.). The type of physical environment may be inferred by the object report software 124. The type of physical environment may also be provided by the user.

As another example, the object report software 124 may consider the current location of the mobile device 120 when classifying the objects. The object report software 124 may obtain the location of the mobile device 120 through location services provided by the mobile device 120 (e.g., using Global Positioning System (GPS) of the mobile device, WiFi location services) or through other ways (e.g., prompting the user to provide a location such as a zip code). As an example, the object report software 124 may give less weight to objects (or manufacturers of objects) that are not typically located in that location. The current location of the mobile device 120 may be transmitted to the server 130 for use in generating the object report.

As another example, the object report software 124 may consider information known about the user when classifying the objects. For instance, in some cases, a home user may provide their home type (e.g., apartment, single-family home) and that information may be used when classifying the objects. For instance, if the known home type is an apartment, an object that is typically found more in single-family homes versus apartments will be given less weight compared to an object that is found in both home types. As another example, the user may provide their property type (e.g., residential or commercial). Certain objects may be found more in commercial properties compared to residential properties (e.g,. an object associated with legal compliance such as an exit sign is typically found in a commercial property and not in a residential property).

In an embodiment, the object report software 124 and/or the server 130 may determine not only the type of the object, but the manufacturer and/or model of the object. The determination of manufacturer and/or model of the object can be determined through text recognition (e.g., a brand name visible on the object, a model number visible on the object, a serial number visible on the object, a part number visible on the object) and/or through image recognition based on unique features associated with a manufacturer and/or model. The determined manufacturer and/or model of the object may be used when classifying the object. The determined manufacturer and/or model of the object may also be transmitted to the server for use in generating the report information about the identified object. Alternatively, the image of the object of interest may be transmitted to the server and the server may determine the manufacturer and/or model of the object (e.g. through text recognition and/or image recognition as described above) and use the determined manufacturer and/or model of the object when generating the report information. For instance, the maintenance plan for one brand of item may be different from the maintenance plan for a competing brand of the same item.

In an embodiment, the mobile device 120 determines the size of the object. The determined size may be used by the object report software when classifying the object and/or may be transmitted to the server for use in generating the report information about the identified object. As an example where the identified object is a window screen, the mobile device 120 may determine the size of the window screen. The mobile device 120 may include a laser measurement device that can be used to measure the size of the object. Alternatively, the mobile device 120 may combine the object inference with device spatial measurement to determine the size of the object.

In an embodiment, the object report software 124 and/or the server 130 may determine the condition of the object of interest. The condition may be in different categories such as excellent, good, fair, poor, or replacement, for example. The determined condition may be transmitted to the server for use in generating the report information about the identified object. Alternatively, the image of the object of interest may be transmitted to the server and the server may determine the condition of the object of interest and use the condition when generating the report information. For instance, if the determined condition of the identified object indicates that the object should be replaced, the server may provide replacement options for the user, which may be specific to the location of the mobile device 120. As another example, the maintenance plan for an object in excellent condition may be different from the maintenance plan for the same object in poor condition (e.g., the object in poor condition may require more and/or different types of maintenance compared to that object in excellent condition).

The object report software 124 an/or the server 130 may include a text recognition component to recognize text on an object. For example, each image frame may be run through a text recognition component to detect whether there is text and if the detected text is of interest. As described elsewhere, the text recognition component may be used to determine the manufacturer, model number, serial number, etc. In addition or alternatively, the text recognition component may also determine dates such as installation dates, service dates, and/or expiration dates. The recognized text may be transmitted to the server for use in generating the report information about the identified object. Alternatively, the image of the object of interest may be transmitted to the server and the server may recognize text on the object and use the recognized text when generating the report information. For instance, if the recognized text indicates that the expiration date has passed, the server may provide replacement options for the user. As another example, if the recognized text includes installation dates and/or past service dates, the server may customize the maintenance plan for the object based on those dates.

In an embodiment, the object report software 124 may determine compliance information regarding the object of interest. As an example, the object report software 124 may determine whether the object of interest is compliant with accessibility or disability ordinances such as ones identified by the Americans with Disabilities Act. To give an example, if a door is the detected object of interest, the object report software 124 may determine whether the door is equipped with compliant opening hardware (e.g., lever, loop, or push hardware) as opposed to a non-compliant knob. Alternatively, the server 130 may determine whether the object of interest is compliant with accessibility or disability ordinances.

In an embodiment, the object report software 124 may determine whether a set of one or more predefined objects of interest are not detected in the physical environment, which may be different depending on the type of physical environment. For instance, the object report software 124 may determine whether a fire extinguisher has been identified as being in the physical environment. As another example, the object report software 124 may determine whether a first aid kit has been identified as being in the physical environment. The list of predefined object(s) that were not found may be transmitted to the server for use in generating the report information.

For each object of interest identified, the mobile device 120 transmits object information to the server 130. The object information may include a list of the identified object(s) of interest, which may be identified by an object identifier. The object information may also include one or more image frames of the object of interest. The object information may include other information about the object as previously described (e.g., condition of the object, size of the object, recognized text about the object). The mobile device 120 may also transmit location information to the server 130 (e.g., the current location of the mobile device 120). The mobile device 120 may transmit information about the user to the server 130.

The server 130 receives the information from the mobile device 120 and prepares an object report. For instance, as shown in FIG. 1, the server 130 includes the object report module 132 and the object report database 134. The object report database 134 stores information about each object such as: a description of the object including the brand and/or model of the object, a maintenance plan for the object (e.g., when maintenance should be performed, what maintenance should be performed, possible professional(s) that can perform the maintenance (which may be dynamically determined based on location of the mobile device 120, availability of professional(s), suitability of professional(s) to perform the maintenance, and/or current market conditions), why the maintenance should be performed, an estimate of the cost of the maintenance, etc.), warranty information of the object, recall information of the object (if any), product availability of the object (e.g., for replacement), expiration date of the object, services available for the object, size of the object, compliance information about the object, etc. The object report module 132 receives the information from the mobile device 120 (e.g., the object information and optionally the location information and/or user information), accesses the object report database 134 to retrieve the appropriate information, and generates the report data. The object report module 132 may implement a data mapping algorithm and the object report database 134 may be an indexed database whose key is the object's label and whose value is the associated information listed above.

The object report database 134 may be a set of one or more databases or other data structures that store the information about each object.

The server 130 transmits the report data back to the mobile device 120. The report data is stored as the object report 128. The object report 128 can be displayed on the user interface of the display 121. For example, the object report software 124 may draw on the image frame the identified object of interest and any associated information from the object report. Alternatively, the object report software 124 may display an option for a user to select to receive more information about the object of interest such that if the user selects that option, the associated information is displayed to the user. As an example, if the information includes a list of professional(s) that can service and/or maintain the object, the report may allow the user to select a professional to invoke software to contact and/or hire that professional to perform the service and/or maintenance. The image frame that contains the object of interest may also be transmitted to that selected professional. The generated report may be saved such that it can be viewed by the user later.

There may be multiple communications between the mobile device 120 and the server 130 for generating and/or displaying the report data. For instance, the mobile device 120 may make multiple queries to the server. For example, an initial object report may show maintenance information about the object and include an option for the user to select to receive more information about the object (e.g., a list of service professionals that can service the object), which when selected, causes the mobile device 120 to query the server to retrieve the more information about the object.

In an embodiment, the mobile device 120 displays object report information over the image on the mobile device (e.g., augmented reality). In such a case, if the mobile device is moved, other object(s) of interest may be identified and associated information may be presented. The information displayed can be received from the server or from local metadata of the mobile device. Thus, embodiments allow for a user to use a mobile device that includes a camera to take a video and the system will automatically identify object(s) of interest, determine information associated with those object(s) (e.g., a maintenance plan for each object of interest, a list of professional(s) that can service and maintain the items, compliance information, etc.), and provide that information to the user. In some cases, the user is not required to provide further input other than taking video of the property.

In an embodiment, the mobile device 120 does not transmit the object information to the server 130 until the user has provided input to stop the recording of the images. For instance, the user may click a button to stop recording video. In response, the object report software 124 may serialize the object(s) of interest identified during the recording session and transmit them to the server 130 potentially along with other information as previously described. The server 130 prepares the report data as previously described. The report may be transmitted back to the mobile device 120 and/or stored such that the user can access the report.

Figure 3:
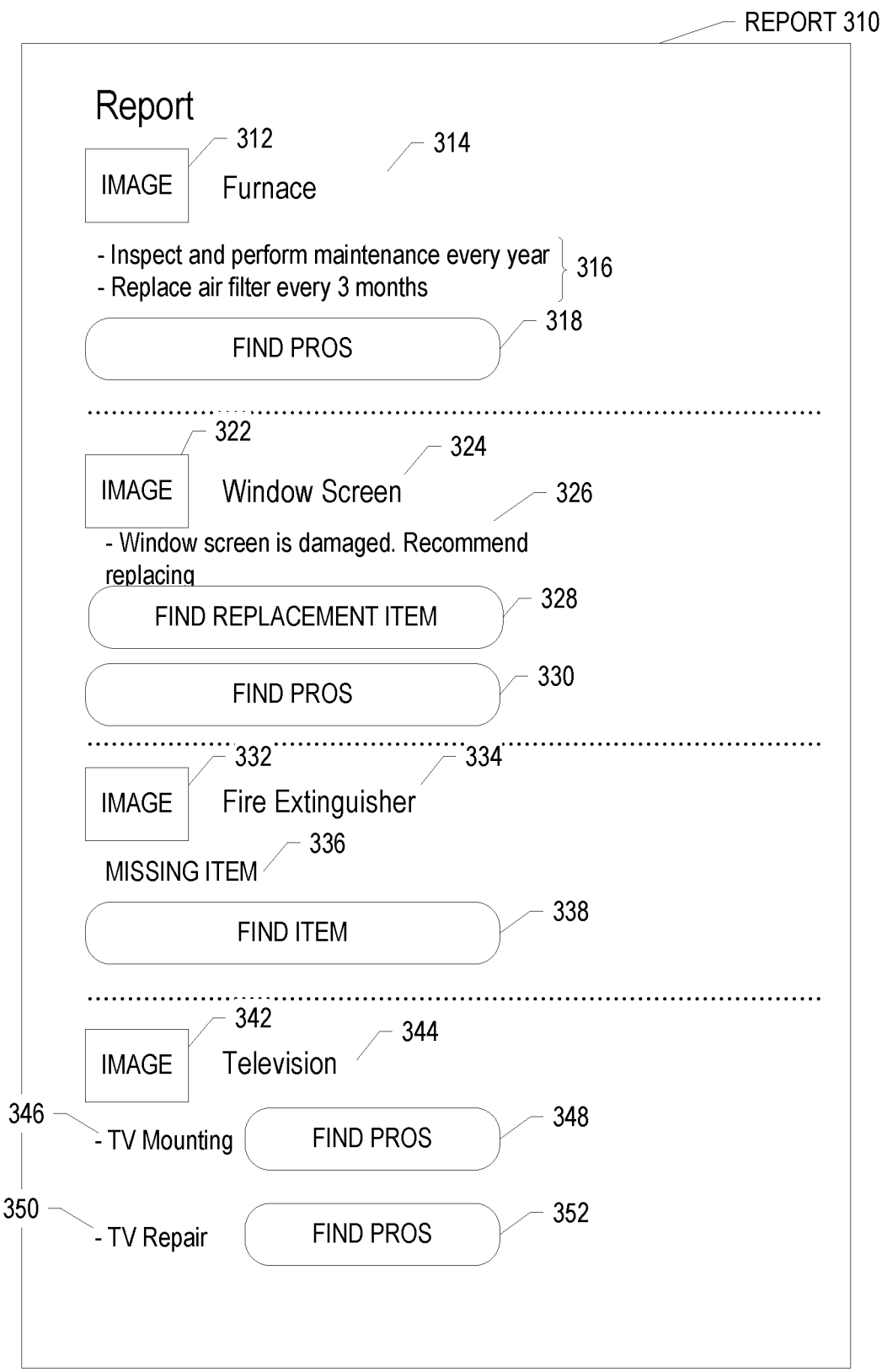
FIG. 3 shows an exemplary report according to an embodiment.

FIG. 3 shows an exemplary report according to an embodiment. The report 310 may be transmitted by the server 130 to the mobile device 120. The report 310 includes information regarding identified objects of interest including a furnace 314, a window screen 324, and a television 344. The report 310 also includes information regarding an object of interest that was not identified; a fire extinguisher 334. The report displays an image of each identified object of interest (e.g., an image captured by the mobile device 120).

For instance, the image 312 is of the identified furnace, the image 322 is of the identified window screen, and the image 342 is of the identified television. The image 332 is of a fire extinguisher, which was not detected in the physical environment.

The record for the identified furnace includes a maintenance plan 316 (e.g., inspect and perform maintenance each year; replace the air filter every 3 months). The record for the identified furnace also includes the selectable 'find pros' button 318 that, when selected, invokes software to contact and/or hire a professional to service the furnace. In an embodiment, upon selection of the 'find pros' button 318, a request for a professional is transmitted to a system that allows the user to contact and/or hire professionals. The request may include a location of the mobile device 120 and may include the image of the furnace.

The record for the identified window screen includes a maintenance plan 326. In this example, the condition of the identified window screen was that it needs to be replaced. As a result, the record for this object includes a selectable 'find replacement item' button 328 that, when selected, invokes software to find and/or purchase a replacement window screen. For example, a browser page may open to a shopping page for window screens that may be suited for replacements. If the mobile device 120 determined the size of the window screen, the size of the window screen may be used for determining the possible replacement items. The record for this object also includes a 'find pros' button 330 that, when selected, invokes software to contact and/or hire a professional to service the window screen (e.g., install a new window screen). In an embodiment, upon selection of the 'find pros' button 330, a request for a professional is transmitted to a system that allows the user to contact and/or hire professionals. The request may include a location of the mobile device 120 and may include the image of the window screen.

The record for the identified television screen includes different service options including a TV mounting option 346 and a TV repair option 350. The TV mounting option 346 may be displayed on the report if the television was determined as not being mounted to a wall of the physical environment. The 'find pros' button 348, when selected, invokes software to contact and/or hire professionals that can mount the television. In an embodiment, upon selection of the 'find pros' button 348, a request for a professional is transmitted to a system that allows the user to contact and/or hire professionals. The request may include a location of the mobile device 120 and may include an image of the television and may include the size of the television if determined by the mobile device 120 and/or otherwise provided to the mobile device 120. The record for this object also includes the TV repair option 350. The 'find pros' button 352, when selected, invokes software to contact and/or hire professionals that can repair the television.

The record for the missing item (the fire extinguisher) includes a description that the item is missing 336. In this example, the record for this object includes a selectable 'find item' button 338 that, when selected, invokes software to find and/or purchase a fire extinguisher. For example, a browser page may open to a shopping page for fire extinguishers that may be suitable for the physical environment.

Although FIG. 3 shows a button that allows the user to contact and/or hire a professional, in another embodiment the report includes a list of professionals that can service and maintain the item where the list is specific to the location of the mobile device (e.g., within a predefined distance of the location of the mobile device).

Figure 4:
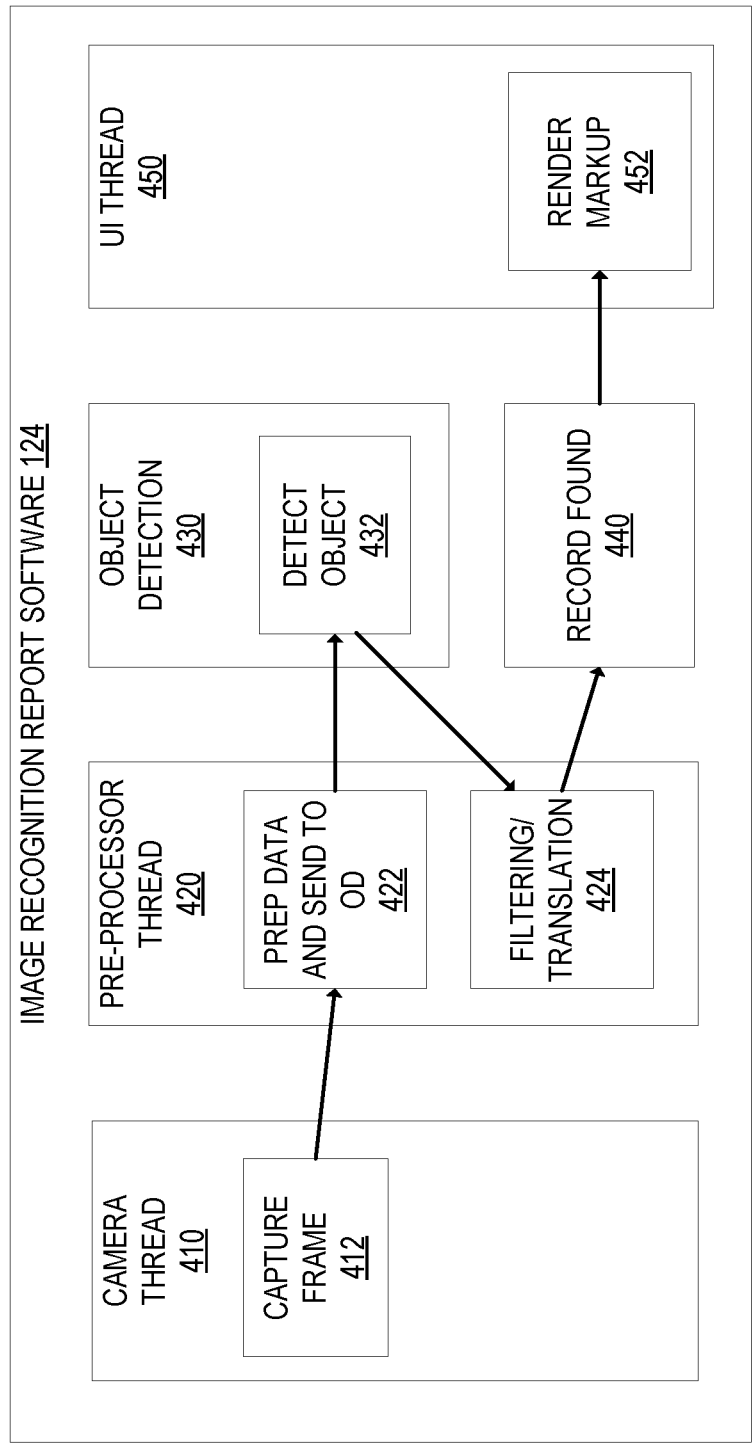
FIG. 4 illustrates an exemplary embodiment of the object report software according to an embodiment.

FIG. 4 illustrates an exemplary embodiment of the object report software 124 according to an embodiment. The object report software 124 performs an initialization procedure. The initialization procedure may include configuring a camera object including applying user preferences (e.g., camera preference (e.g., front or back), frame rate), etc.), setting a camera preview callback that is called when the camera preview publishes a new frame, setting the graphics surface that renders the current frame from the camera once it is started, and configuring buffering for the frames to provide a smooth video experience for the user. The initialization procedure may also include creating an object detector object and loading the image recognition library 126 from the local storage on the device and passing that as configuration to the object detector object. The initialization procedure may also set up a separate worker thread (e.g., the pre-processor thread 420) to process the frames such that when the camera preview callback is called, the worker thread is notified that a frame is available to be processed.

The camera thread 410 captures an image frame 412 from the camera component 122. This capture may be responsive to a user selecting a button to start capturing image(s). The captured frame data is processed by the pre-processor thread 420 including generating the data and sending the data 422 to the object detection 430. Generating the data may include converting the frame data into a format that the object detection 430 understands. For example, the frame data may be in a first image format (e.g,. a bitmap) and the object detection 430 may process the data of a second image format. In such a case, the first image format is converted to a second image format for the object detection 430 to process. The object detection 430 is run in a separate thread and performs the object detection 432 in connection with the image recognition library 126. The object detection 430 provides a list of detected objects back to the pre-processor thread 420.

The pre-processor thread 420 filters and translates 424 the list of detected objects. For instance, for each detected object, the pre-processor thread checks whether the label for the object is in the list of relevant labels (and is thus an object of interest). If the label for the object is not in the list of relevant labels, then the pre-processor thread 420 discards the data. Further, the object detection 430 may return a confidence level for each object that is found and the pre-processor thread 420 may filter based on confidence level (e.g., discard the data if the confidence level is below a confidence threshold). A mapping of labels to confidence thresholds may be downloaded and stored on the device. If the label for the object is in the list of relevant labels, and if the confidence level is greater than the confidence threshold, then further record found 440 processing is performed. For instance, if this is the first time the object with the label has been discovered, the bitmap of the object may be saved to internal storage; and the object may be recorded in a detected object dictionary in memory of the device. The UI thread 450 may render markup 452 of the display in the graphics surface. For example, a box may be drawn around the object.

Figure 5:
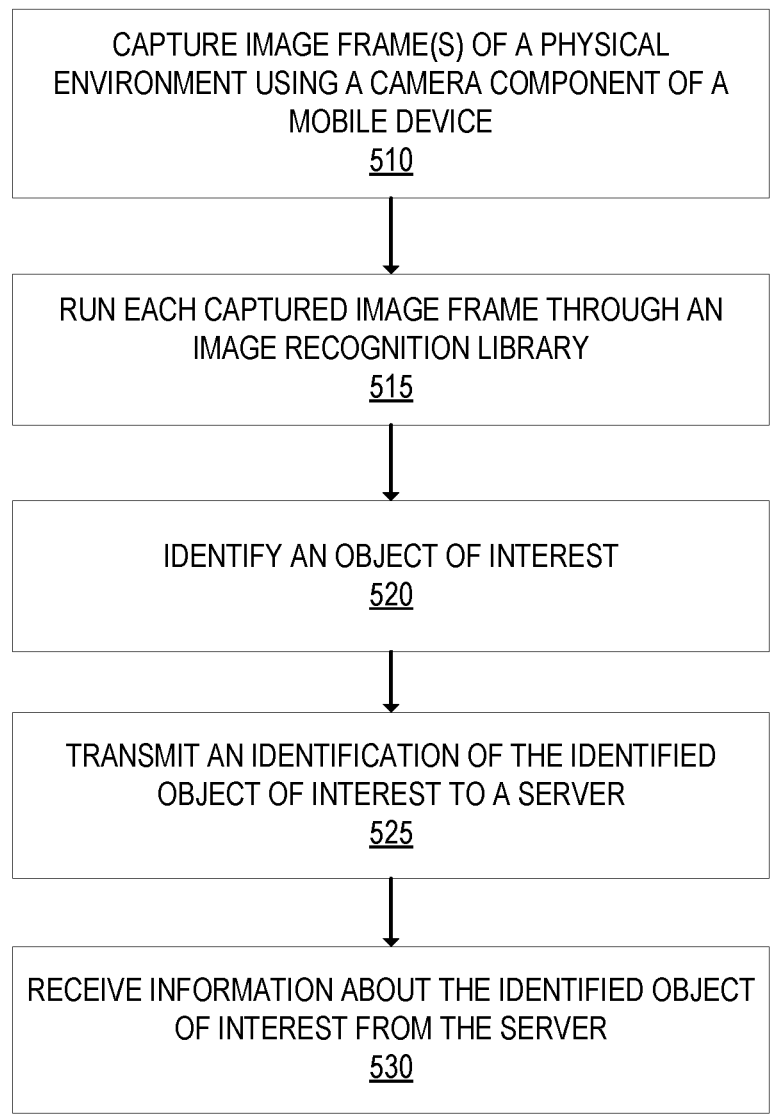
FIG. 5 is a flow diagram for using image recognition for constructing and managing a property plan according to an embodiment.

FIG. 5 is a flow diagram for using image recognition for constructing and managing a property plan according to an embodiment. The operations of FIG. 5 are described with respect to the exemplary embodiment of FIG. 1. However, the embodiment of FIG. 1 can perform operations different from the operations of FIG. 5, and the operations of FIG. 5 can be performed by different embodiments from the embodiment of FIG. 1.

At operation 510, the mobile device 120 captures image frame(s) of a physical environment 110 using the camera component 122 of the mobile device 120. The physical environment 110 may be indoors and/or outdoors. As an example, the physical environment 110 may be a room within a property such as a home or a commercial property. In practice, a user of the mobile device 120 may use the camera component 122 to capture image frames of the physical environment, such as by recording a video of the physical environment 110.

Next, at operation 515, the mobile device 120 runs each captured image frame through an image recognition library to identify object(s) of interest. The image recognition is based on a machine learning algorithm that classifies the objects. In an embodiment, the image recognition does not use contextual information when classifying the objects. In another embodiment, the image recognition considers contextual information when classifying the objects such as the spatial position and/or orientation of the mobile device; the type of physical environment; the location of the mobile device; known information of the user, the determined size of the object, and/or textual information on the object; as previously described herein.

Next, at operation 520, the mobile device 120 identifies an object of interest based on running each image frame through the image recognition library. The identified object of interest may be an item associated with periodic maintenance and/or have compliance requirements.

Next, at operation 525, the mobile device 120 transmits an identification of the identified object of interest to the server 130. The image frame that contains the identified object may also be transmitted to the server 130. The mobile device 120 may also transmit other information about the object to the server 130 (e.g., condition of the object, size of the object, and/or recognized text about the object). The mobile device 120 may also transmit location information to the server 130 (e.g., the current location of the mobile device 120). The mobile device 120 may transmit information about the user to the server 130. The mobile device 120 may also transmit information to the server 130 regarding object(s) that were not identified by the mobile device 120. Such objects may include items required for safety (e.g., fire extinguisher, smoke detector, carbon monoxide detector) and/or compliance (e.g., exit signs, fire escape plans, wheelchair ramps, etc.).

The server 130 receives the information from the mobile device 120 and prepares an object report. For instance, based on the information, the server 130 accesses a database (e.g., the object report database 134) and determines the information to include on the object report. The report may include information that is specific to the location of the mobile device 120. The report may include, for each identified object, a description of the object, a maintenance plan for the object (e.g., when maintenance should be performed, what maintenance should be performed, possible professional(s) that can perform the maintenance (which may be within a predefined distance of the mobile device 120), why the maintenance should be performed, an estimate of the cost of the maintenance, etc.), warranty information of the object, recall information of the object (if any), product availability of the object (e.g., for replacement), expiration date of the object, brand and/or identification of the object (e.g., particular HVAC system, particular water heater), identified condition of the object (e.g., excellent, good, fair, poor, replacement), detected size of the object, compliance status of the object (e.g., whether the object is compliant with disability compliance ordinances, a suggestion or recommendation for making the object be in compliance (which may include replacing the object with a compliant object), a list of professional(s) that can provide services to put the object into compliance), etc. The report may include, for each identified object, a list of professional(s) that can service and/or maintain the object, and the report may allow the user to select a professional to invoke software to contact and/or hire that professional to perform the service and/or maintenance. The report may also include information about object(s) of interest that were not detected in the physical environment including items required for compliance.

Next, at operation 530, the mobile device 120 receives information about the identified object from the server 130. For instance, the mobile device 120 receives the object report. The mobile device 120 may display the object report, potentially overlaying the report, or a link to the report, on the object in real-time on the view screen of the mobile device 120.

Although embodiments have been described where the mobile device 120 uses an image recognition library hosted on the mobile device 120 itself, alternatively the mobile device 120 may transmit the captured image frame(s) to a remote device, such as the server 130, that performs the image recognition and identifies the object(s) of interest using an image recognition library. In such an embodiment, the mobile device 120 may also transmit contextual information to the server 130 for use in classifying the objects (e.g., the spatial position and/or orientation of the mobile device; the type of physical environment; the location of the mobile device; known information of the user, the determined size of the object, and/or textual information on the object; as previously described herein). The server 130 may return the object report information to the mobile device 120 as previously described.

As described herein, an image recognition library is used for classifying the objects. The image recognition library uses a model file that provides the data required to identify the objects in the image frame. The model file may be periodically retrained using the images that are recorded by users.

Figure 6:
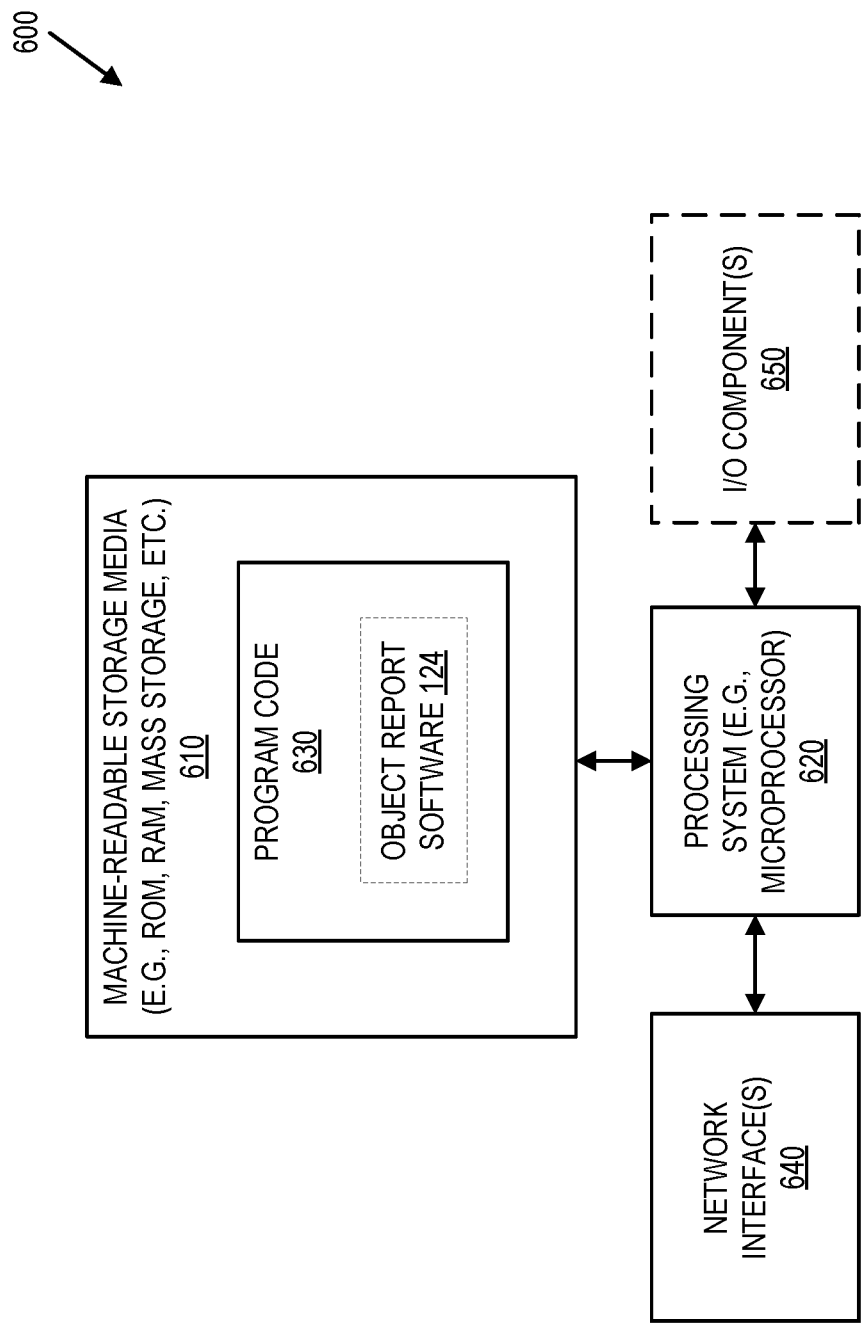
FIG. 6 is a block diagram illustrating a data processing system that can be used in an embodiment.

FIG. 6 illustrates a block diagram for an exemplary data processing system 600 that may be used in some embodiments. One or more such data processing systems 600 may be utilized to implement the embodiments and operations described with respect to the mobile device 120 and/or the server 130. Data processing system 600 includes a processing system 620 (e.g., one or more processors and connected system components such as multiple connected chips).

The data processing system 600 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 610 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 620. For example, the depicted machine-readable storage media 610 may store program code 630 that, when executed by the processor(s) 620, causes the data processing system 600 to execute the object report software 124, and/or any of the operations described herein.

The data processing system 600 also includes one or more network interfaces 640 (e.g., a wired and/or wireless interfaces) that allows the data processing system 600 to transmit data and receive data from other computing devices, typically across one or more networks (e.g., Local Area Networks (LANs), the Internet, etc.). The data processing system 600 may also include one or more input or output ("I/O") components 650 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 600, and, in certain embodiments, fewer components than that shown in one or more buses may be used to interconnect the various components shown in FIG. 6.

The techniques shown in the figures can be implemented using code and data stored and executed on one or more electronic devices (e.g., a mobile device, a server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals— such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the preceding description, numerous specific details are set forth in order to provide a more thorough understanding. It will be appreciated, however, by one skilled in the art that embodiments may be practiced without such specific details. In other instances, control structures, gate level circuits and full software instruction sequences have not been shown in detail in order not to obscure understanding. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for image recognition and report generation, comprising:
   capturing a plurality of image frames of a physical environment using a camera component of a mobile device;
   running the plurality of image frames through an image recognition library on the mobile device;
   identifying a plurality of objects of interest based on at least the running the plurality of image frames through the image recognition library, wherein a first identified object of interest of the plurality of objects of interest is a first item associated with periodic maintenance, and wherein a second identified object of interest of the plurality of objects of interest is a second item associated with periodic maintenance;
   transmitting an identification of the first identified object of interest to a server;
   transmitting an identification of the second identified object of interest to the server; and
   receiving, from the server, an object report that includes:
      information about the first identified object of interest that is based on a location of the mobile device, the information about the first identified object of interest including a first maintenance plan for the first identified object of interest and a first option to locate a part associated with the first identified object of interest, wherein the first maintenance plan includes a first recommended maintenance to be performed for the first identified object of interest, a first cadence to perform the first recommended maintenance, and a second option to interact with a first set of one or more professionals that are suitable for performing the first recommended maintenance for the first identified object of interest, and wherein selection of the first option to locate the part causes presentation of a web browser page comprising a retrievable version of the part associated with the first identified object of interest, and
      information about the second identified object of interest that includes both a recommended improvement associated with the second identified object of interest and a second maintenance plan for the second identified object of interest, wherein the second maintenance plan includes a second recommended maintenance to be performed for the second identified object of interest and a second cadence to perform the second recommended maintenance, wherein the information about the second identified object of interest further includes a third option to interact with a second set of one or more professionals that are suitable for performing the second recommended maintenance for the second identified object of interest and a fourth option to interact with a third set of one or more professionals that are suitable for providing the recommended improvement associated with the second identified object of interest, wherein the first option, the second option, the third option, and the fourth option are independently and optionally selectable, via a user interface, by a user.

2. The method of claim 1, further comprising:
determining a spatial position of the mobile device as the mobile device captures the plurality of image frames; and
wherein the identifying the plurality of objects of interest further includes using the respective determined spatial position of the mobile device.

3. The method of claim 1, further comprising:
determining, through the running the plurality of image frames through the image recognition library, a condition of the first identified object of interest; and
transmitting the determined condition of the first identified object of interest to the server, and wherein the received information about the first identified object of interest is further customized based on the determined condition of the first identified object of interest.

4. The method of claim 1, further comprising:
transmitting a geolocation of the mobile device to the server.

5. The method of claim 1, further comprising:
determining a size of the first identified object of interest using the mobile device;
transmitting the determined size of the first identified object of interest to the server; and
wherein the received information about the first identified object of interest is further customized based on the determined size of the first identified object of interest.

6. The method of claim 1, further comprising:
detecting text on at least one image frame of the plurality of image frames that contains the first identified object of interest;
performing text recognition based on the detected text to obtain a text string;
determining that the text string is a text string of interest;
transmitting the text string of interest to the server; and
wherein the received information about the first identified object of interest is further customized based on the text string of interest.

7. The method of claim 1, further comprising:
determining, from the captured plurality of image frames of the physical environment, that the physical environment does not include a particular object;
transmitting, to the server, an identification of the particular object determined to not be included in the physical environment; and
wherein the object report further includes information about the particular object determined to not be included in the physical environment.

8. The method of claim 1, further comprising:
determining a type of the physical environment;
transmitting the type of the physical environment to the server; and
wherein the received information about the first identified object of interest is further customized based on the type of the physical environment.

9. The method of claim 1, further comprising:
identifying a third object of interest based on at least the running the plurality of image frames through the image recognition library, wherein the identified third object of interest is an item that has compliance requirements;
transmitting, to the server, an identification of the identified third object of interest and an image of the identified third object of interest; and
wherein the object report further includes information about the identified third object of interest including a compliance status of the identified third object of interest.

10. The method of claim 9, wherein the compliance status indicates that the identified third object of interest is not in compliance, and wherein the information about the identified third object of interest includes a recommendation for making the identified third object of interest be in compliance.

11. The method of claim 1, further comprising:
identifying, based on at least the running the plurality of image frames through the image recognition library, contextual information around the second identified object of interest; and
transmitting the contextual information to the server;
wherein the recommended improvement associated with the second identified object of interest is determined based on the contextual information.

12. A non-transitory computer-readable storage medium that provides instructions that, when executed by a processor, cause said processor to perform operations comprising:
capturing a plurality of image frames of a physical environment using a camera component of a mobile device;
running the plurality of image frames through an image recognition library on the mobile device;
identifying a plurality of objects of interest based on at least the running the plurality of image frames through the image recognition library, wherein a first identified object of interest of the plurality of objects of interest is a first item associated with periodic maintenance, and wherein a second identified object of interest of the plurality of objects of interest is a second item associated with periodic maintenance;
transmitting an identification of the first identified object of interest to a server;
transmitting an identification of the second identified object of interest to the server; and
receiving, from the server, an object report that includes:
information about the first identified object of interest that is based on a location of the mobile device, the information about the first identified object of interest including a first maintenance plan for the first identified object of interest and a first option to locate a part associated with the first identified object of interest, wherein the first maintenance plan includes a first recommended maintenance to be performed for the first identified object of interest, a first cadence to perform the first recommended maintenance, and a second option to interact with a first set of one or more professionals that are suitable for performing the first recommended maintenance for the first identified object of interest, and wherein selection of the first option to locate the part causes presentation of a web browser page comprising a retrievable version of the part associated with the first identified object of interest, and
information about the second identified object of interest that includes both a recommended improvement associated with the second identified object of interest and a second maintenance plan for the second identified object of interest, wherein the second maintenance plan includes a second recommended maintenance to be performed for the second identified object of interest and a second cadence to perform the second recommended maintenance, wherein the information about the second identified object of interest further includes a third option to interact with a second set of one or more professionals that are suitable for performing the second recommended maintenance for the second identified object of interest and a fourth option to interact with a third set of one or more professionals that are suitable for providing the recommended improvement associated with the second identified object of interest, wherein the first option, the second option, the third option, and the fourth option are independently and optionally selectable, via a user interface, by a user.

13. The non-transitory computer-readable storage medium of claim 12, wherein the operations further comprise:
determining a spatial position of the mobile device as the mobile device captures the plurality of image frames; and
wherein the identifying the plurality of objects of interest further includes using the respective determined spatial position of the mobile device.

14. The non-transitory computer-readable storage medium of claim 12, wherein the operations further comprise:
determining, through the running the plurality of image frames through the image recognition library, a condition of the first identified object of interest; and
transmitting the determined condition of the first identified object of interest to the server, and wherein the received information about the first identified object of interest is further customized based on the determined condition of the first identified object of interest.

15. The non-transitory computer-readable storage medium of claim 12, wherein the operations further comprise:
transmitting the location of the mobile device to the server.

16. The non-transitory computer-readable storage medium of claim 12, wherein the operations further comprise:
determining a size of the first identified object of interest using the mobile device;
transmitting the determined size of the first identified object of interest to the server; and
wherein the received information about the first identified object of interest is further customized based on the determined size of the first identified object of interest.

17. The non-transitory computer-readable storage medium of claim 12, wherein the operations further comprise:

detecting text on at least one image frame of the plurality of image frames that contains the first identified object of interest;
performing text recognition based on the detected text to obtain a text string;
determining that the text string is a text string of interest;
transmitting the text string of interest to the server; and
wherein the received information about the first identified object of interest is further customized based on the text string of interest.

18. The non-transitory computer-readable storage medium of claim 12, wherein the operations further comprise:
determining, from the captured plurality of image frames of the physical environment, that the physical environment does not include a particular object;
transmitting, to the server, an identification of the particular object determined to not be included in the physical environment; and
wherein the object report further includes information about the particular object determined to not be included in the physical environment.

19. The non-transitory computer-readable storage medium of claim 12, wherein the operations further comprise:
determining a type of the physical environment;
transmitting the type of the physical environment to the server; and
wherein the received information about the first identified object of interest is further customized based on the type of the physical environment.

20. The non-transitory computer-readable storage medium of claim 12, wherein the operations further comprise:
identifying a third object of interest based on at least the running the plurality of image frames through the image recognition library, wherein the identified third object of interest is an item that has compliance requirements;
transmitting, to the server, an identification of the identified third object of interest and an image of the identified third object of interest; and
wherein the object report further includes information about the identified third object of interest including a compliance status of the identified third object of interest.

21. The non-transitory computer-readable storage medium of claim 20, wherein the compliance status indicates that the identified third object of interest is not in compliance, and wherein the information about the identified third object of interest includes a recommendation for making the identified third object of interest be in compliance.

22. The non-transitory computer-readable storage medium of claim 12, wherein the operations further comprise:
identifying, based on at least the running the plurality of image frames through the image recognition library, contextual information around the second identified object of interest; and
transmitting the contextual information to the server;
wherein the recommended improvement associated with the second identified object of interest is determined based on the contextual information.

23. The non-transitory computer-readable storage medium of claim 12, wherein the recommended improvement associated with the second identified object of interest is unrelated to the second recommended maintenance to be performed for the second identified object of interest.

24. The non-transitory computer-readable storage medium of claim 12, wherein the second identified object of interest comprises a television, the recommended improvement associated with the second identified object of interest comprises television mounting, and the second recommended maintenance to be performed for the second identified object of interest comprises television service.

25. The non-transitory computer-readable storage medium of claim 12, wherein the operations further comprise:
identifying the first identified object of interest based on a textually recognized serial number within at least one image frame of the plurality of image frames, wherein the identification of the first identified object of interest transmitted to the server is the serial number.

26. The non-transitory computer-readable storage medium of claim 12, wherein the first option to locate the part associated with the first identified object of interest uses a size associated with the part to identify the retrievable version of the part, and wherein the web browser page comprises an option to purchase the retrievable version of the part having the size.

* * * * *